United States Patent
Cerasa et al.

(10) Patent No.: US 8,830,916 B2
(45) Date of Patent: Sep. 9, 2014

(54) METHOD FOR THE DYNAMIC RESERVATION AND ALLOCATION OF TIME SLOTS IN A NETWORK WITH SERVICE WARRANTY

(75) Inventors: Antonio Cerasa, Spoltore (IT); Domenico Mazzocchetti, Arcueil (FR); Sebastiano Schillaci, Vasto (IT); Dominique Heurguier, Le Perreux sur Marne (FR); Didier Thebault, Herblay (FR); Marc Bavant, Paris (FR)

(73) Assignee: Thales, Neuilly sur Seine (FR)

( * ) Notice: Subject to any disclaimer, the term of this patent is extended or adjusted under 35 U.S.C. 154(b) by 947 days.

(21) Appl. No.: 12/520,869

(22) PCT Filed: Dec. 21, 2007

(86) PCT No.: PCT/EP2007/064427
§ 371 (c)(1),
(2), (4) Date: Aug. 9, 2010

(87) PCT Pub. No.: WO2008/077928
PCT Pub. Date: Jul. 3, 2008

(65) Prior Publication Data
US 2011/0013601 A1 Jan. 20, 2011

(30) Foreign Application Priority Data

Dec. 22, 2006 (FR) ...................... 06 11279

(51) Int. Cl.
| | |
|---|---|
| H04W 4/00 | (2009.01) |
| H04B 7/212 | (2006.01) |
| H04W 72/00 | (2009.01) |
| H04B 7/00 | (2006.01) |
| H04W 28/26 | (2009.01) |
| H04W 28/04 | (2009.01) |
| H04W 28/18 | (2009.01) |
| H04W 28/24 | (2009.01) |
| H04W 72/04 | (2009.01) |
| H04W 84/18 | (2009.01) |

(52) U.S. Cl.
CPC .............. *H04W 28/26* (2013.01); *H04W 28/04* (2013.01); *H04W 28/18* (2013.01); *H04W 28/24* (2013.01); *H04W 72/0446* (2013.01); *H04W 84/18* (2013.01)
USPC ........... 370/329; 370/330; 370/341; 370/348; 455/451; 455/452.2; 455/512

(58) Field of Classification Search
CPC ... H04L 5/0032; H04L 5/0035; H04L 5/0058; H04L 5/0071; H04L 5/0085; H04L 5/0087; H04W 28/021; H04W 28/0226; H04W 28/0236; H04W 28/0247; H04W 28/0257; H04W 28/0268; H04W 28/26; H04W 72/0046; H04W 72/048; H04W 72/0486; H04W 72/10; H04W 72/18; H04W 84/18
USPC ................. 370/329–330, 341–345, 347–349; 455/450–452.2, 509–513
See application file for complete search history.

(56) References Cited

U.S. PATENT DOCUMENTS

| | | | |
|---|---|---|---|
| 6,708,034 B1 * | 3/2004 | Sen et al. ..................... 455/445 |
| 2002/0093983 A1 | 7/2002 | Newberg et al. |
| 2002/0196808 A1 | 12/2002 | Karri et al. |
| 2003/0035396 A1 * | 2/2003 | Haartsen et al. .............. 370/336 |
| 2004/0228353 A1 | 11/2004 | Balachandran et al. |
| 2005/0030968 A1 * | 2/2005 | Rich et al. .................... 370/449 |
| 2006/0083193 A1 * | 4/2006 | Womack et al. .............. 370/328 |
| 2006/0083197 A1 * | 4/2006 | Kang ............................ 370/329 |
| 2006/0268908 A1 * | 11/2006 | Wang et al. ................... 370/401 |
| 2007/0274320 A1 * | 11/2007 | Joshi et al. ................ 370/395.2 |
| 2008/0112371 A1 * | 5/2008 | Joshi et al. .................... 370/337 |

FOREIGN PATENT DOCUMENTS

WO WO-2004/102989 A 11/2004

* cited by examiner

*Primary Examiner* — Un C Cho
*Assistant Examiner* — Jeremy Costin
(74) *Attorney, Agent, or Firm* — Stroock & Stroock & Lavan LLP

(57) ABSTRACT

A method of resource reservation with service guarantee in terms of throughput and deadline at the level of the N nodes of a radio network using time slots to send and transmit data is disclosed, which implements a global reservation process in which a reservation message sent uses at least one of the following two parameters: the maximum deadline required to access the radio medium, the minimum throughput required in order to satisfy the service guarantee. A dynamic time slot allocation scheme is used that is defined in the following manner: the N nodes each include K slots, including a control slot, P elastic slots and (K-1-P) session slots, and the (K-1-P) session slots are amalgamated for the allocation of resources required by a node at a given instant.

11 Claims, 7 Drawing Sheets

Slot Type 0 → ED & CTRL slots
Slot Type 1 → Session Slot

FIG.4

Slot Type 0 → ED & CTRL slots
Slot Type 1 → Session Slot

METHOD FOR THE DYNAMIC RESERVATION AND ALLOCATION OF TIME SLOTS IN A NETWORK WITH SERVICE WARRANTY

CROSS-REFERENCE TO PRIOR APPLICATION

This is a U.S. National Phase Application under 35 U.S.C. §371 of International Application no. PCT/EP2007/064427, filed Dec. 21, 2007, and claims benefit of French Patent Application No. 0611279, filed Dec. 22, 2006, both of which are incorporated herein. The International Application was published in French on Jul. 3, 2008 as WO 2008/077928 under PCT Article 21 (2).

FIELD OF THE INVENTION

Embodiments of the invention relate to TDMA (Time Division Multiple Access) ad hoc radio networks. They are aimed, more particularly, at the allocation of the slots between the various nodes of the network and the capacity for reserving resources including constraints on throughput and end-to-end latency.

Various embodiments may also be applied in TDMA multi-channel systems (for example T/FDMA for Time and Frequency Division Multiple Access), radio networks using OFDMA (Orthogonal Frequency Division Multiple Access) modulation and any other system, which uses time slots and a dynamic allocation scheme instead of a fixed allocation scheme.

PRIOR ART

TDMA radio networks generally use static allocations. The allocation is either completely fixed (cyclic frame with one slot per node), or defined in advance for a configuration.

The new radio systems are beginning to give consideration to quality of service, but this consideration does not yet make it possible to support the global reservation of resources with end-to-end service guarantee (in terms of throughput and latency), in particular the IP (Internet Protocol) based service guarantee protocols, such as the RSVP (standing for Reservation Protocol) resource reservation protocol.

Another drawback of the prior art is its inability to avoid saturation of the heavily worked nodes, even if the other nodes of the network possess unused and available resources.

As regards the allocation of resources, current TDMA radio systems do not support the reservation of resources and the network may not guarantee both minimum throughput and maximum end-to-end latency.

SUMMARY OF THE INVENTION

Embodiments of the invention relate to a medium access control MAC level method allowing the dynamic allocation of the resource slots with a service guarantee. Two types of traffic are distinguished: elastic traffic and session traffic. The session traffic corresponds to continuous multimedia streams (voice and video) and time-real data streams for which a strong service guarantee (throughput and latency) is desired.

Various embodiments make it possible, on the one hand, to receive and to process resource reservation requests for session streams originating from the higher layers (IP layer typically). These reservation requests include the constraints of minimum throughput, but also of maximum packet transmission deadline (over a hop). They are typically formulated by a global reservation process, such as the RSVP over IP protocol, making it possible to dissect global constraints of guaranteed minimum throughput and of maximum end-to-end latency into local throughput constraints for known application stream characteristics associated with a maximum packet transmission deadline, at the level of each of the nodes of the path.

Embodiments of the invention make it possible, on the other hand, to carry out dynamic allocations of session slots in a local manner, that is to say without recourse to centralized management, during normal operation. The method according to one or more embodiments of the invention relies, notably, on explicit allotting of the session slots to one or more nodes and on a concept of reserving these slots. A slot allotted to a node can be freely reserved by this node so as to satisfy a resources reservation request. Viewed from a given node, the set of unreserved session slots forms a group or pool of resources from which it can potentially draw.

In a first step, the node which receives a reservation request will formulate a configuration for reserving session slots. A resources allocation algorithm will then select slots from this pool in such a way that the reservation configuration satisfies the constraints while favoring its own slots. A node which does not have sufficient inherent resources to satisfy the reservation request, will formulate a reservation configuration by using the session slot pool involving its own session slots to the maximum, but also session slots of the pool which are not allotted to it.

In a second step, the allocation is negotiated with the neighboring nodes, while taking account of the slots used by the neighbors (effective sharing of a resource) but also, of the potential interference situations relating to the spatial reuse of the slot in space (spatial reuse of a resource). The management of such interference therefore allows the spatial reuse of the session slots, thus allowing scaling, as a function of the number of nodes of the network.

Additionally, a switch to the MAC level (relaying) can be performed on the session streams so as to reduce the transit time in each node, avoid going to the higher layer (IP typically) and guarantee low jitter by maintaining an MAC path for the session by carrying out "route pinning" at the MAC level.

One or more embodiments of the invention relates to a method for reserving resources with service guarantee in terms of throughput and deadline at the level of the N nodes of a radio network using time slots to send and transmit data, characterized in that it implements a global reservation process in which a reservation message sent uses at least one of the following two parameters: the maximum deadline required to access the radio medium and/or the minimum throughput required in order to satisfy the service guarantee.

An aspect of the invention relates to a method of resource reservation with service guarantee in terms of throughput and deadline at the level of the N nodes of a radio network using time slots to send and transmit data, characterized in that it implements a global reservation process in which, a reservation message sent uses at least one of the following two parameters: the maximum deadline required to access the radio medium, the minimum throughput required in order to satisfy the service guarantee.

It implements, for example, a dynamic time slot allocation scheme defined in the following manner: the N nodes each including K slots, including a control slot, P elastic slots and (K-1-P) session slots, the (K-1-P) session slots are amalgamated for the allocation of resources required by a node at a given instant.

ADVANTAGES

The embodiment method and related system according to the invention offer notably the following advantages:
- Making in common free resources belonging to several nodes, so as to avoid the saturation of one or more nodes.
- Guaranteeing a quality of service at the node level on the session streams in terms of throughput, transmission deadline and jitter.
- Making it possible to put in place guarantees of application service (at the level of the higher layers) in terms of minimum throughput and maximum latency value as regards end-to-end. This is then carried out by implementing a global reservation mechanism (such as the standard RSVP over IP protocol).
- The optimization of the global resources of a TDMA radio network (the dynamic allocation makes it possible, for example, at the routing level, to favor the paths with minimum number of jumps).
- The spatial reuse of the slots so as to increase the global capacity of the network and introduce scaling as a function of the number of nodes of the network.
- To afford knowledge regarding the use of the resources at the MAC layer level.

BRIEF DESCRIPTION OF THE DRAWINGS

Other characteristics and advantages of one or more embodiments of the present invention will be more apparent on reading the description which follows and an example given by way of wholly nonlimiting illustration, in conjunction with the figures which represent.

DESCRIPTION OF THE PREFERRED EMBODIMENTS

In order to better elucidate the principle implemented in the method according to the invention, the description is given by way of wholly nonlimiting illustration, for a TDMA ad hoc radio network in which all the nodes are autonomous and play one and the same role. For this purpose, they are each equipped with a processor suitable for implementing the steps of the method according to one or more embodiments of the invention. They are also provided with radio means, sender and receiver, making it possible to transmit and to receive the messages transmitted to other nodes or originating from these other nodes. Each node includes, as is detailed hereinafter, several tables: a DRAM table containing the information relating to the nodes, a table of visibility of the other nodes, a status table, a time slot table, etc. A few reminders and definitions are given as a preamble to the description of the method and of the system according to one or more embodiments of the invention.

Terminology

The architecture of a radio frame is made up of four layered elements in which the useful data will be conveyed:
- (Useful) data unit: packet of the application (IP packet for example),
- Elementary MAC Resource: MAC packet (encapsulation packet at the MAC level of an application packet),
- Time slot: slot,
- Basic frame: BF,
- Frame: F.

MAC Packet

The MAC packet is an elementary data structure at the MAC level. NPS is the number of MAC packets that a node can transmit in a time slot.

Time Slot and Basic Frame

Figure 1:
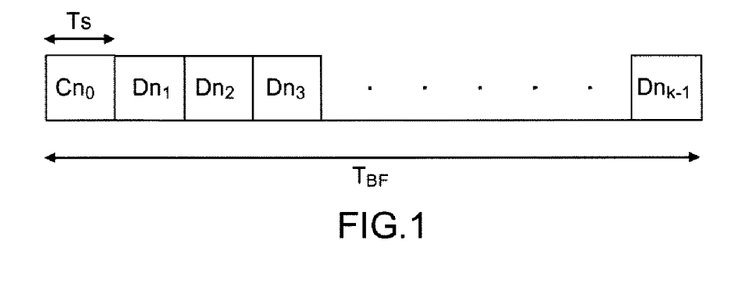
FIG. 1, an exemplary basic frame relating to a node n,
FIG. 2, a frame structure,
FIG. 3, a frame structure in terms of allocation of slots,
FIG. 4, an exemplary non-interleaved frame,
FIG. 5, an exemplary interleaved frame,
FIG. 6, an exemplary interleaving algorithm,
FIG. 7, a representation of the horizons for 1 jump (zone 1), 2 jumps (zone 2) and greater than 2 jumps (zone 3) for a given node (node A in the example),
FIG. 8, an example of distributions of packets belonging to various sessions within a session slot,
FIG. 9 an MAC packet structure,
FIG. 10, an exemplary network made up of 6 nodes,
FIG. 11 an exemplary reservation configuration for the network of FIG. 10,
FIG. 12, a block diagram of a pre-emption mechanism,
FIG. 13, an exemplary exchange of messages for the negotiation of a reservation: sending of "SAR" request by node 3 and of "SAC" confirmation messages by the neighboring nodes 2, 5 and 6,
FIG. 14, an example of sending two simultaneous "SAR" requests in one and the same frame by nodes 1 and 3, of sending "SAC" confirmation messages by the neighboring nodes 4 and 5 for node 1, by nodes 6 and 2 for node 3, followed by a request for deallocating of node 3.

The basic frame and the "slots" are illustrated in FIG. 1.
Cn: control slot for node n.
Dn: slot allotted to node n.
Ts: duration of the slot.
K: number of slots making up the basic frame.
$T_{BF}$: duration of the basic frame with $T_{BF}=K*Ts$.

Each basic frame relates to a specific node. The example illustrated in FIG. 1 shows the basic frame of node n. Each basic frame contains K slots. The first slot $Cn_0$ in each basic frame is called the "control slot". It is a "fixed slot" allocated permanently to node n. Node n uses this slot to transmit the MAC level signaling (signaling packets necessary for the operation of the services of the MAC level, such as the discovery of neighbors and frame synchronization).

The slot Dni (where i=1 ... K-1) represents one of the K-1 slots allotted, a priori, to node n. This node n can use this slot to transmit its own data or can lend this slot to another node, by implementing the steps of the method according to one or more embodiments of the invention. This implies that, in relation to FIG. 1, a node m can request and obtain from node n, permission to transmit on the slot Dni.

The slots can be divided into two classes:
- The "elastic" slots used to transmit the elastic data: in general, a subset p of Dni (where i=1 ... K-1) slots are allocated statistically to a node so as to transmit elastic data. Thus, Dnj (where j=1 ... p) slots are reserved for the transmission of elastic data.
- The "session" slots used to transmit session packets. These slots can support elastic data.
- If the control slot and the elastic slots are discounted, the K-1-p remaining slots constitute session slots which are dynamically allocatable, so as to transmit the session packets. The session slots allotted, but not used by the node to which they are allotted, can be grouped together into a set or pool and shared between all the nodes of the network.

Frame

Figure 2:
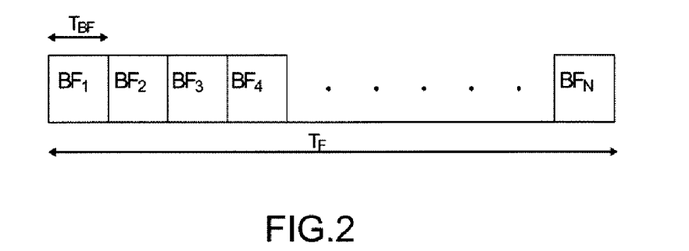

Each node is responsible for managing its own basic frame (on initializing the method, the basic frame defines notably the allotted slots). The sequence of the basic frames for the set of nodes of the network makes up the frame. If the network is formed of N nodes, the frame structure is, for example, that which is represented in FIG. 2.

$BF_n$ corresponds to the basic frame managed by node n; K the number of slots making up a basic frame; $T_F$ the duration of the frame, with $T_F = N*T_{BF} = N*K*Ts$.

The period of a frame depends on the parameters K number of slots making up a basic frame, and N, the number of nodes making up the network.

Slot Management and Resource Reservation Request

Figure 3:
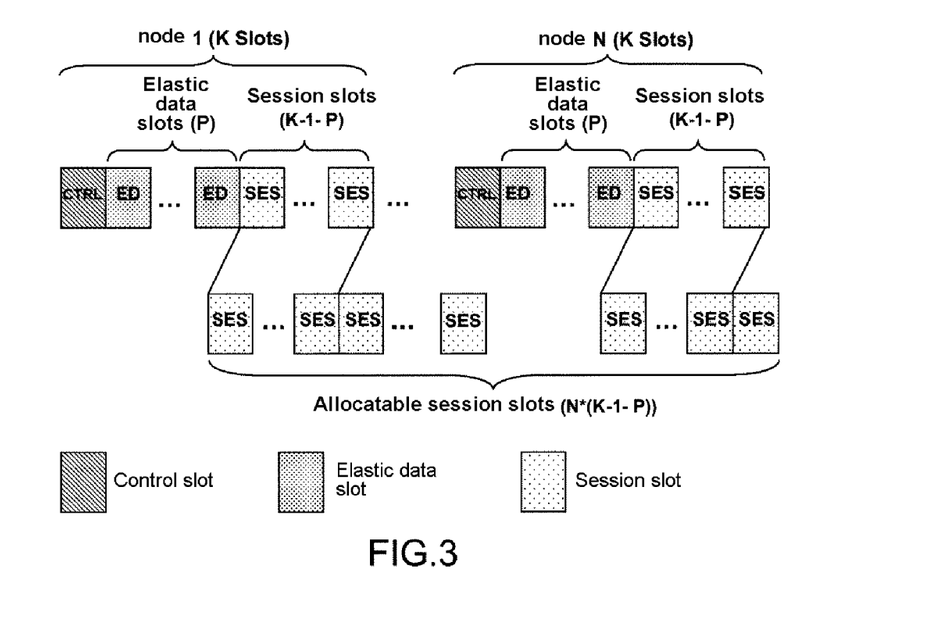

FIG. 3 represents an exemplary structure of a frame and its make-up. Each basic frame is made up of K slots. Thus, if the total number of nodes is N, the total number of slots making up the frame is N*K. Inside each basic frame, a control slot CTRL or $Cn_0$ is reserved for the MAC level signaling and P slots are used to transmit the elastic data ED. The remaining slots, K-1-P, are used to transmit the session packets SES, the latter are put in common (i.e., pooled or shared) so as to be shared between all the nodes of the network. For the N nodes this corresponds to (N*(K-1-P)) session slots.

Each node can potentially use any session slot of the pool, although the control slot and the elastic slots are definitively allocated to a node.

In the presence of a new session, the MAC layer receives a resource reservation request together with a minimum throughput constraint and with a maximum radio access deadline constraint.

Each slot is characterized by an associated elementary throughput. A node n can thus evaluate the number of slots which it requires in order to satisfy the reservation request in terms of throughput based on the elementary throughput offered by a slot.

In relation to the requirements of the applications, the higher layer can request an increase or a decrease in the occupancy of the MAC layer by way of resource reservation requests. It is the MAC layer which carries out the actual allocation of the resources corresponding to a resource reservation request for a session. This MAC layer decides how many session slots are necessary in order to satisfy the resource reservation request and commences inherent procedures to establish which slots in the frame will be used, and more particularly which MAC packets are reserved.

Interleaving Method

In order to make the radio access time homogeneous and minimal for all the nodes, it is possible to interleave the slots. An inherent interleaving algorithm is used by each of the nodes to define the real-time sequence of the slots.

Figure 4:
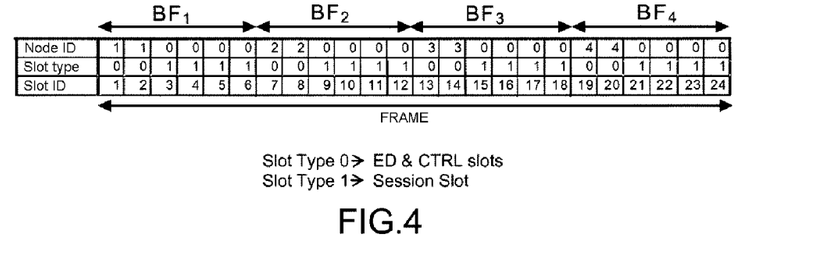

FIG. 4 shows schematically a non-interleaved frame, with K=6 and N=4. The position of the slots is distributed regularly according to the nodes.

Figure 5:
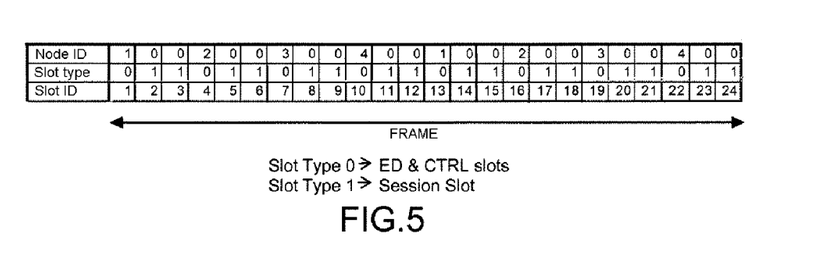

FIG. 5 shows schematically an exemplary frame for which there is interleaving.

Figure 6:
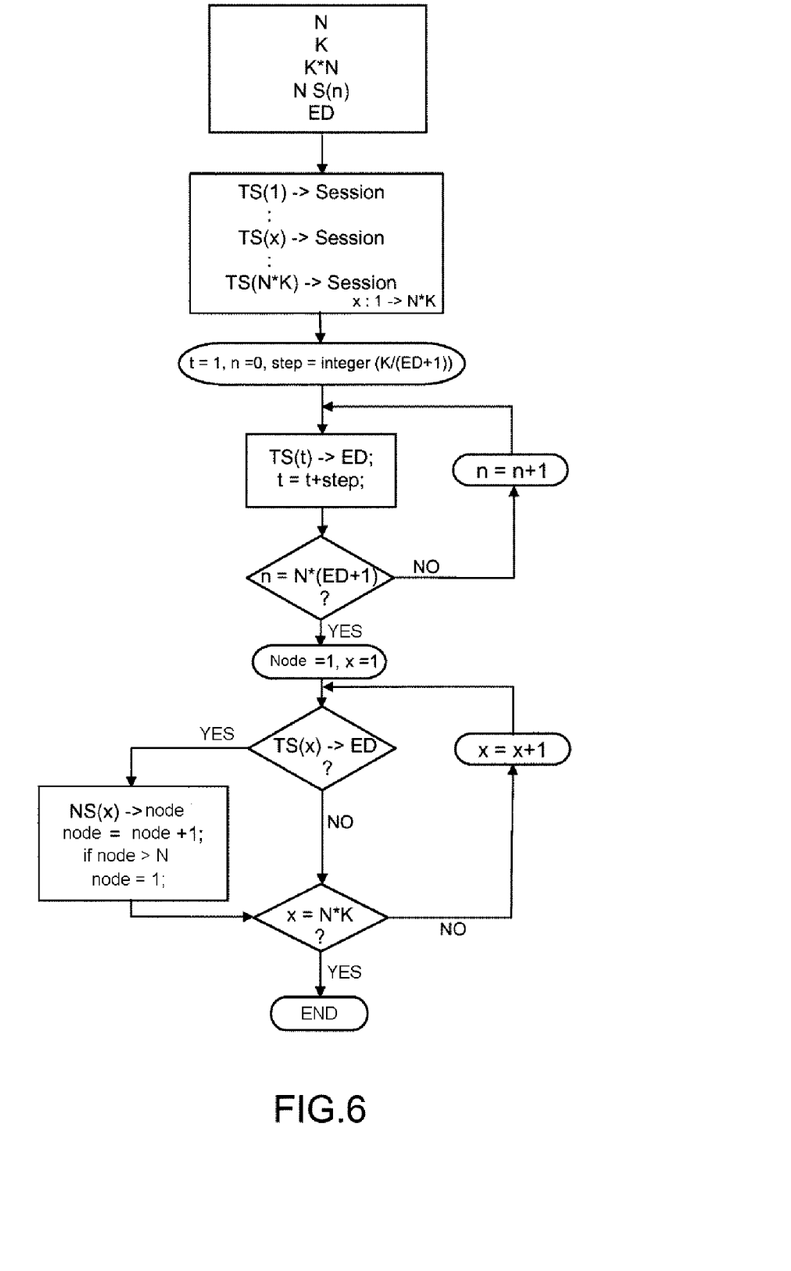

FIG. 6 illustrates an exemplary interleaving algorithm which is as follows: if the position (k*N) is occupied, k being the index of the slots, slot (k*N)+1 will be used and so on and so forth.

Allocation of the Session Slots

Upon a request to reserve resources for a new session, a resource allocation algorithm formulates a configuration for reserving session slots, and more particularly MAC packets (belonging to the session slots).

Several constraints are taken into account at the level of this algorithm:
 The allocated resources must be compatible with the minimum throughput requirements specified in the reservation request,
 The maximum radio access deadline must be compatible with the maximum deadline imposed in the reservation request.

Moreover, the method according to one or more embodiments of the invention can implement an optimization algorithm which makes it possible to increase the transmission capacity of a node by using notions of reuse of resources, spatial reuse of slots.

Figure 7:
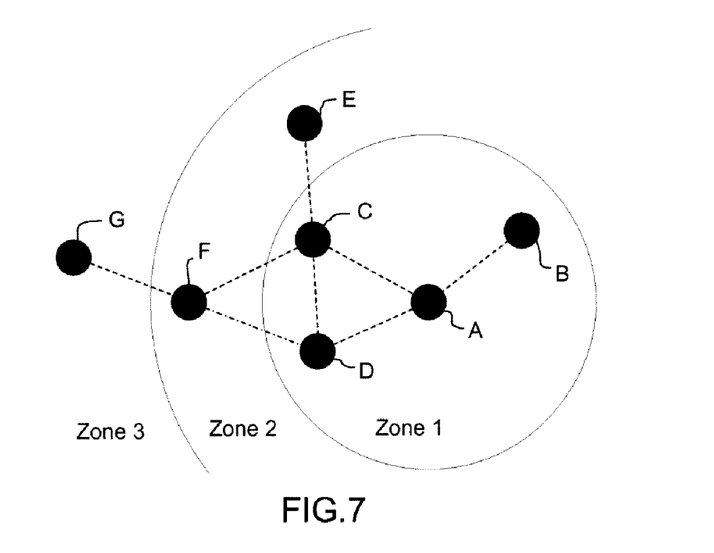

FIG. 7 represents the decomposition of the horizon for each of the nodes into several zones. For example, for node A, the network is divided into three zones defined in the following manner:
 "Zone 3", this includes all the nodes which are at least three hops away from A,
 "Zone 2", zone which includes all the nodes which are 2 hops away from A,
 "Zone 1", includes all the nodes which are one hop (direct neighbors) away from A.

If node A (zone 1) and a node of zone 3, for example node G (zone 3), transmit packets in the same slot, there is no collision on this slot, since the addressees of node A for this slot are not in range of the other nodes of zone 3, such as G, which use this slot. For the same reason, node A and another node situated in zone 3 can reuse the same slot.

Conversely, if node A (zone 1) and node F (zone 2) use the same slot, node C and node D cannot receive the set of packets transmitted in this slot because of the collision.

To summarize, the nodes fewer than 2 hops away cannot use one and the same slot, but conversely, a slot can be spatially reused beyond 3 hops. On this base, the method will formulate at the level of each node, a knowledge of the allocation of the slots over a horizon of two nodes, thereby making it possible, on the one hand, to negotiate the slot loan locally and, on the other hand, to spatially reuse the slots.

Each node thus stores its knowledge of the slots used by the nodes which are one or two hops away in a DRAM table.

For maximum avoidance of reservation conflicts, before using slots managed by other nodes, a node should verify its DRAM table and propagate its content to all the nodes which are one hop and two hops away. This information is dispatched by way of dedicated messages.

DRAM Table

The dynamic resource allocation mechanism is based on an exchange of information performed by virtue of the MAC control packets conveyed in the control slots CTRL. For this purpose, a DRAM table stores:
 three types of slots: 0: session slot; 1: control slot; 2: elastic data slot;
 ID slot: the slot number in the frame in the interval 0 to N*K-1;
 status: this field is made up of 24 bits. The 20 least significant bits relate to the 20 nodes of the network. If the $p^{th}$ bit (starting from the right) is set to 1, this signifies that node p uses the slot considered.

In the DRAM table of a node, only the information relating to the nodes which are one or two hops away is stored. For the other nodes, more than two hops away, the node has no visibility. All the nodes of the network construct their own table in the same manner.

Visibility Table

A node also possesses a visibility table made up of two columns. The first column corresponds to the nodes which are situated one hop away from the node, it contains the ID or identifier of the nodes situated one hop away. The second column contains the identifiers ID of the nodes situated two hops away, which can be reached by way of the node which is stored in the first column and the same row.

Based on its visibility table, and on N, the maximum number of nodes in the network, each node can construct another table, the table of distant nodes, which contains all the identifiers ID of the nodes which are further than two hops away. This table of distant nodes is used, notably, to search for the identifiers ID of the nodes whose resources can be reused.

The visibility table and the table of distant nodes are constructed by dispatching "Hello" messages (containing the identity of the sender node) in the control slots.

| One hop | Two hops |
|---|---|
| ID of the node | ID of the node |

Status Table

The table of statuses contains two fields "next hop" which contains the IDs of the nodes and "status" which contains true or false. The status can be true, if a slot allocation confirmation message is received or else false otherwise.

| Next hop | status |
|---|---|
| Node ID | True or false |

Table of Slots

Another useful table is the table of slots,

| ID of the slot | Number of sessions | Number of packets for session 0 | ID of session 0 | ... | Number of packets for session N − 1 | ID of session N − 1 |
|---|---|---|---|---|---|---|
| | | | ... | | | |

Its content is as follows:
Slot ID; this field contains the ID of a slot,
Number of sessions: this value represents the total number of sessions transmitted inside the slot,
Number of packets for session K: this field contains the number of MAC packets reserved for the $k^{th}$ session in the slot.

Figure 8:
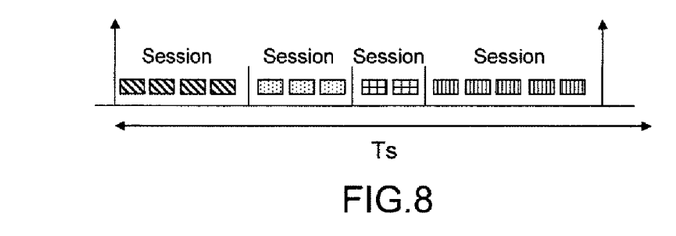

FIG. 8 shows schematically a case where there are several MAC packets belonging to various sessions in a simple slot of duration Ts;

IDs of session K: this value represents the identifier (the IDs) corresponding to the session. The sessions are differentiated in the figure by hatching.

Table of Reservation Requests Undergoing Processing

When a request for a new session is sent by the higher layers, the session IDs and the priority level are, for example, stored in a special table whose content is as follows:
Session IDs: the identifier IDs of the new session,
Priority: the priority level of the session is stored in this field,
Status: this field is set to 1 if the request is undergoing processing and
if the request has been processed. A request undergoing processing is a request for which the allocation process has begun but the slots have not yet been reserved.

| Session IDs | priority | status |
|---|---|---|

A request may be undergoing processing for the following reasons:
The node has not yet received all the SAC responses of the close neighbor nodes,
The node has received a response which is not intended for it and thus it should deallocate resources.

If several requests arrive, they are stored in the table and are processed one after another. When the node has to choose the request to be served, the session having the highest priority is served first.

Types of Packets

Figure 9:
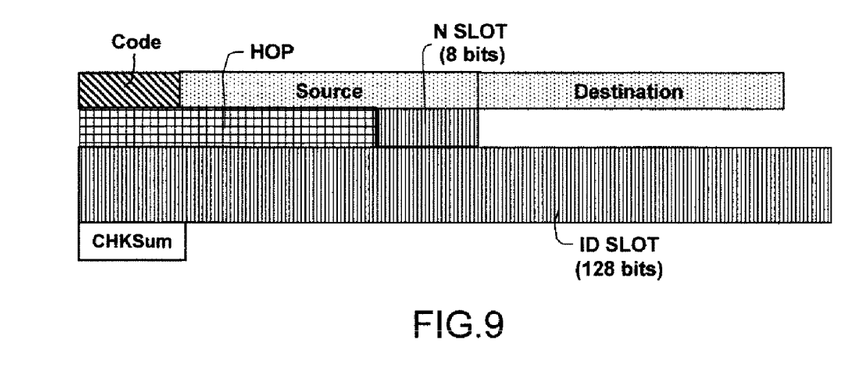

All the MAC packets have the structure shown schematically in FIG. 9, containing the following fields:
Code: this field indicates the type of packets,
Source Field: contains the source address of the sender node,
Destination Field: contains the destination address of the addressee node;
HOP Field: contains the number of hops,
N slot Field: contains the number of slot IDs written into the ID slot field,
ID slot Fields: contain the IDs of the slots,

Procedure for Negotiating the Slots

There are, for example, four types of messages used in the procedure for negotiating the slots
slot allocation request or SAR: this message is transmitted by a node when it wishes to make a slot allocation request,
slot allocation confirmation or SAC: this message is dispatched by a node when it wishes to confirm a possible slot allocation. The confirmed slots are written into the slot ID field, slot deallocation request or SDR: this message is sent by a node when it wishes to make a deallocation request for the previously allocated slots. These slots are written into the ID slot field.

Slot deallocation confirmation or SDC: this message is dispatched by a node when it wishes to make a deallocation confirmation. The slots for which the message is intended are stored in the slot ID field.

Dynamic Allocation Method

The dynamic allocation method according to one or more embodiments of the invention, can be divided, for example, into three main steps:

E1—calculation of the minimum total number of MAC packets and of slots required for a session as a function of the minimum throughput constraint imposed by the reservation request;

E2—calculation of the identities (ID) of the slots in the frame so as to satisfy the reservation request. The algorithm for selecting the session slots should comply with the maximum radio access deadline constraint imposed by the reservation request as well as the minimum number of reserved MAC packets;

E3—negotiation with the neighbors in the case when new slots are impressed by way of an SAR request message.

Determination of the Number of Slots Required

The calculation of the total number of slots required for a session depends on the constraints imposed in the resource reservation request. The input parameters are given in the request and are used to determine the necessary slots:

throughput required (RB) in bits/s;
maximum deadline (MD) to access the radio medium in ms;
maximum size of the data packets (PS) of the application in bits;

The way in which the higher layer reservation method (such as typically for RSVP over IP) is dissected in terms of resource reservation request is detailed further on.

The other parameters, given as system constraints, are for example:

The number N of nodes in the network;
The number of slots K making up the basic frame;
The throughput (BR) of the radio link in bits/s;
the duration of the slot (Ts);
the number NPS of MAC packets in a slot;
a the number of bits M used to encapsulate each packet.

The maximum number of bits which can be transmitted in a slot is given by the product of the throughput and the duration of the slot $$Bs = BR*Ts$$

The number of bits used for the encapsulation of a data packet of the application is subtracted from Bs. Thus, the maximum number of useful bits for the encapsulation of data UBs is given by:

$$UBs = Bs - M*NPS$$

The number of slots necessary to satisfy just the throughput ("bandwidth") constraint BWs is given by:

$$BW_S = \frac{RB}{\frac{UB_S}{T_F}}$$

where $T_F$ is the duration of the frame given by:

$$T_F = N*K*T_S$$

the total number of slots in a frame is given by:

$$NSF = N*K$$

Taking into account the deadline constraint MD, the number of slots $D_S$ necessary to satisfy this requirement is:

$$D_S = \frac{T_F}{MD}$$

Once $BW_S$ and $D_S$ have been calculated, the number of necessary slots $TN_S$ is given by the maximum of the two parameters:

$$TN_S = \max(BW_S, D_S)$$

The method thereafter determines the maximum distance between a first session slot and the next; this value $MD_S$ is given by:

$$MD_S = \frac{NSF}{TN_s}$$

This signifies that there is a session slot every $MD_S$ slots in the frame. If the maximum size of the packet PS is larger than the useful value of the bit $UB_S$, the number of consecutive slots is:

$$CS = \frac{PS}{UB_S}$$

Calculation of a Reservation Configuration, of the Identifiers ID of the Slots and of the MAC Packets to be Reserved with Pre-Emption Mechanism Starting from the value of the distance $MD_S$ (maximum distance between two slots) determined during the previous step, and the minimum throughput constraint, it is necessary to determine the identifiers ID of the slots to be reserved.

The selection of the session slots and the formulation of a reservation configuration is carried out with the aid of a resource allocation algorithm.

This algorithm determines an allocation solution which complies with the following constraints:

temporal spacing, between two successive reserved slots, which is less than the distance $MD_S$ calculated during the previous step,
priority use of the slots already allotted to the node,
most regular possible temporal spacing of the reserved slots,
number of reserved MAC packets (on the borrowed slots and on the inherent slots) guaranteeing the minimum throughput required,
in the case of absence of solution, possibility of pre-emption of the inherent slots reserved for sessions of lesser priority.

The input parameters for this step are:
The number of slots necessary for the session;
The number of consecutive slots CS;
The value of the DRAM table;
The value of the visibility table.

The formulation of the reservation configuration at node level relies on a resource allocation algorithm integrating the constraints sent in the reservation request. One heuristic, for example, includes examining each slot beginning from the first free slot in the basic frame, and then searching gradually to select a session slot which satisfies the maximum radio access deadline constraint. At the end of this selection process, new slots are optionally reserved if the minimum throughput constraint is not complied with. The algorithm knows, by consulting a DRAM table associated with the node considered, whether a session slot is free or occupied, that is to say already completely used by the node considered (and no longer having any MAC packet available) or already reserved by another node which is situated one or two hops away from the node itself.

Thus, in the heuristic described, the session slots are examined chronologically in the frame. If the slot is free, its identifier ID is placed in a list of slot ID's and we go to the slot ID which is a value MDs slots away from the current slot. If this new slot is free its ID is stored in the previous list. Otherwise, we return slot by slot until a free session slot is found. The heuristic continues to be played out until the end of the frame is reached. At the end the method has a list of slots that can be used for the session.

Figure 10:
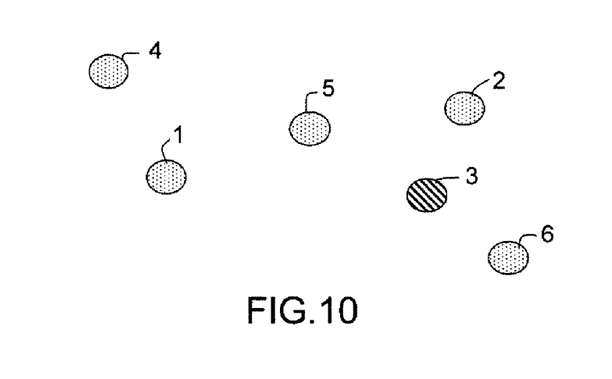
Figure 11:
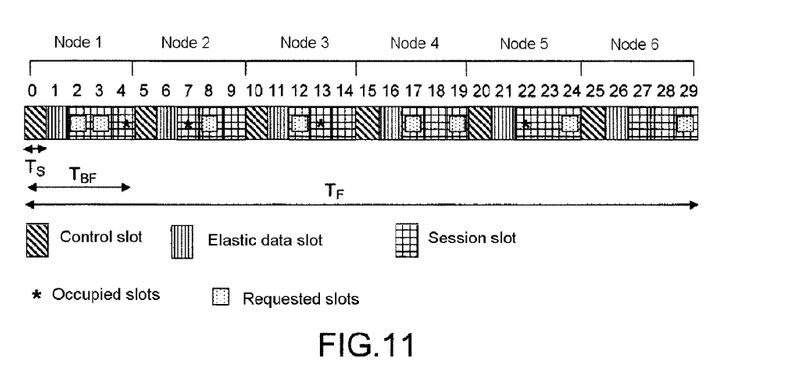

FIGS. 10, 11 illustrate an exemplary session slot reservation configuration formulation based on the allocation heuristic previously described for a network including 6 nodes. It is assumed in this example that there are 6 nodes in the network and that each basic frame is made up of K=5 slots, one of the slots being used to transmit elastic data (P=1). The case where node 3 has to reserve resources for a data session is considered. Let us assume that the minimum throughput required for the session is 5 kbits/s and that the maximum transmission deadline is 50 ms.

| | |
|---|---|
| N = 6 | number of nodes in the network |
| K = 5 | number of slots in each basic frame |
| P = 1 | number of elastic slots (for the data) in each basic frame |
| $T_S$ = 10 ms | duration of the slot |
| $T_F$ = 300 ms | duration of the frame |
| BR = 1 Mbit/s | throughput of the TDMA channel |
| NPS = 3; | number of packets in a slot |
| M = 72 bits; | header for encapsulation of packets |
| RB = 5 kbit/s | throughput required |
| MD = 50 ms | maximum packet transmission deadline |

The useful bits in a slot and the number of slots, necessary to satisfy the bandwidth constraint, are calculated as set out hereinafter:

$$B_S = BR * T_S = 10^6 * 10^{-2} = 10^4 \text{ bits}$$

$$UB_S = B_S - M * NPS = 10^3 - 72 * 3 = 9784 \text{ bits}$$

$$BW_S = \frac{RB}{\frac{UB_S}{T_F}} = \frac{5 * 10^3}{\frac{9784}{300 * 10^{-3}}} = 0.15$$

The value $BW_S$, of minimum number of slots to satisfy the throughput constraint, is approximated to the first largest integer. In this case, the value $BW_S$ is equal to 1.

As regards the constraint on the maximum deadline, the number of slots necessary to satisfy this request, is given by:

$$D_S = \frac{T_F}{MD} = \frac{300}{50} = 6$$

$$TN_S = \max(BW_S, D_s) = 6$$

The maximum distance between one session slot and the next is given by:

$$MD_S = \frac{NSF}{TN_S} = \frac{30}{6} = 5$$

This signifies that a session slot is needed every 5 slots in the frame.

Let us assume that the slots labeled with a star in FIG. 11 correspond to slots used by nodes which are one or two slots away from node 3 or slots already allotted to node 3 but completely occupied.

To calculate the identifier of the available slot IDs, the method commences from slot 2, it checks whether it is free. If it is, it stores this identifier ID(2) in a list. Thereafter, it hops 5 slots ahead and checks the status of the new current slot. In this example, this is slot 7. By verifying in the DRAM table (of node 3), it turns out that this slot is already occupied, therefore we backtrack until we find a free slot. In the example, this slot corresponds to slot 3. By following this principle, the available slots are 2, 3, 8, 12, 17, 19, 24 and 29. The last test to be executed is to verify that the distance between the last available slot (slot 29) and the first slot available in the next frame (slot 2) is less than MDs. In the example, the test is OK.

The entire procedure is repeated, beginning from the second free slot in the frame until the end of the frame, if necessary.

At the end of this reservation configuration formulation procedure, if no solution has been found, the MAC layer rejects the resource reservation request for the instigation of a new session. Moreover, if the solution found selects only slots already allotted to the node considered, the request is accepted and the associated MAC packets are reserved. In the case where the solution involves slots not allotted to the node considered, we pass to the step of sending an SAR allocation request for negotiation with the neighboring nodes.

Figure 12:
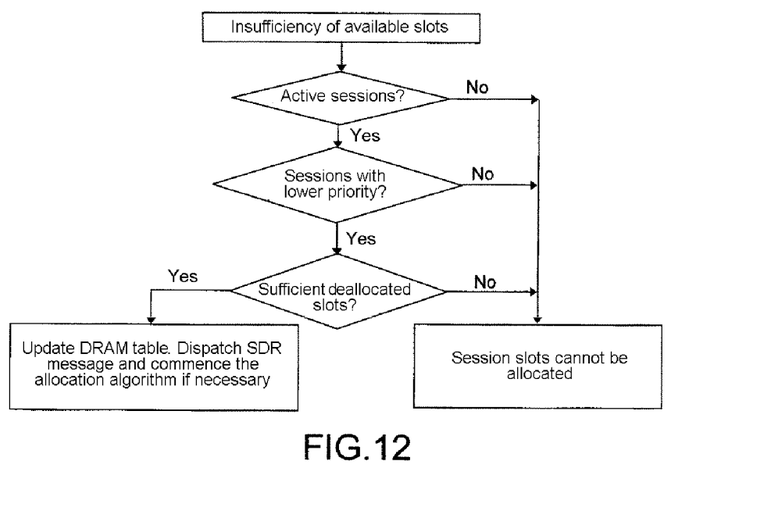

FIG. 12 represents a block diagram of a pre-emption mechanism.

One of the input parameters for the slot allocation is its priority level. If there exist enough session slots which can be allocated to a session, the priority level of the request is satisfied. If there is a session having a lower priority level, the method examines whether by deallocating all the slots belonging to this session of low priority, whether it is possible to find a reservation configuration solution for the new session of higher priority level.

This mechanism is called a pre-emption mechanism and ensures that the services of high priority can be guaranteed locally optionally, by deallocating slots belonging to sessions of lower priority level.

SAR Request for the Allocation of Slots

In order to explain the slot allocation request process, let us assume that node 3 has chosen the set of slots [2, 3, 8, 12, 17, 19, 24, 29] and wishes to send a request for slot allocation. This information is transmitted by an SAR message (Slot Allocation Request) to the other neighboring nodes of the network.

When a node transmits an SAR packet, it creates a table containing its close neighbor nodes within the sense of "next hop" and a status field. This status field can be filled in with true or false, depending on the reception of the corresponding slot allocation confirmation dispatched by its close neighbor nodes (next hop nodes). Moreover, the node initializes a time counter "timer" so as to check whether an SAC packet has been lost. Generally, the node waits an entire frame period before renewing the request.

Referring to node 3, its status table is:

| Next hop | Status |
| --- | --- |
| Node 2 | True |
| Node 5 | True |
| Node 6 | true |

Node 3 has nodes 2, 5 and 6 as nodes situated a "next hop" away. Initially, the status corresponding to the nodes is set to false. The node waits until it has received all the SAC packets of its close hop nodes. If there is no problem, the statuses of all the nodes in the status table are set to true, as indicated above, and the DRAM table of node 3 is updated by setting to 1 the bit, in the column corresponding to the slot ID which has been requested, corresponding to the nodes ID.

In the example, the third bit in the status field of the column corresponding to the slot IDs 2, 3, 8, 12, 17, 19, 24 and 29 is set to 1.

Figure 13:
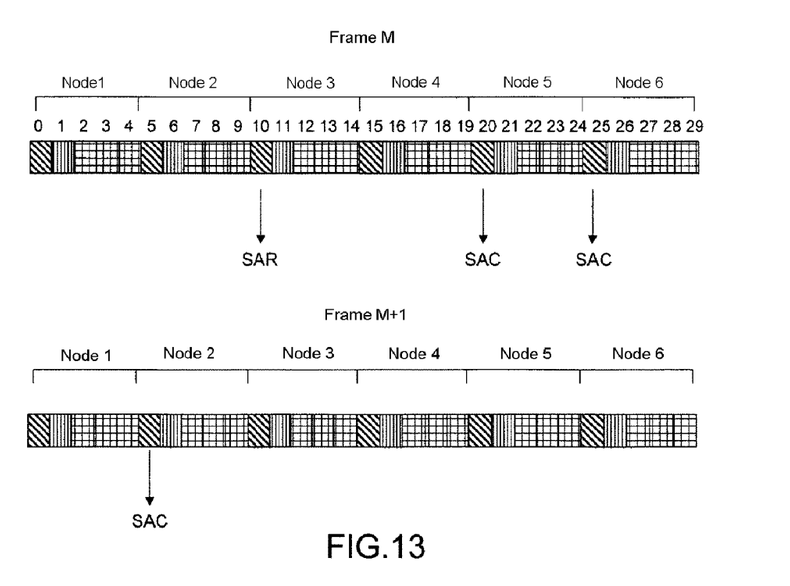

If there is no problem, see FIG. 13, node 3 dispatches an SAR message in its control slot $C_3$ and receives the SAC messages from nodes 5, 6 and 2 in the control slots $C_5$, $C_6$ and $C_2$.

If the timer expires, then the node erases all the tables and dispatches a new SAR message.

An SAC packet is received with a destination address which is different from that of the node: in this case, the DRAM table is reupdated. Thereafter a comparison test is performed which compares the identities of the slots that the node has requested in its SAR packet and those of the SAC packet received.

If there are no common slots a new SAR message is dispatched. Otherwise, a deallocation message "Slot Deallocation Requested (SDR)" is dispatched and the procedure is repeated.

Figure 14:
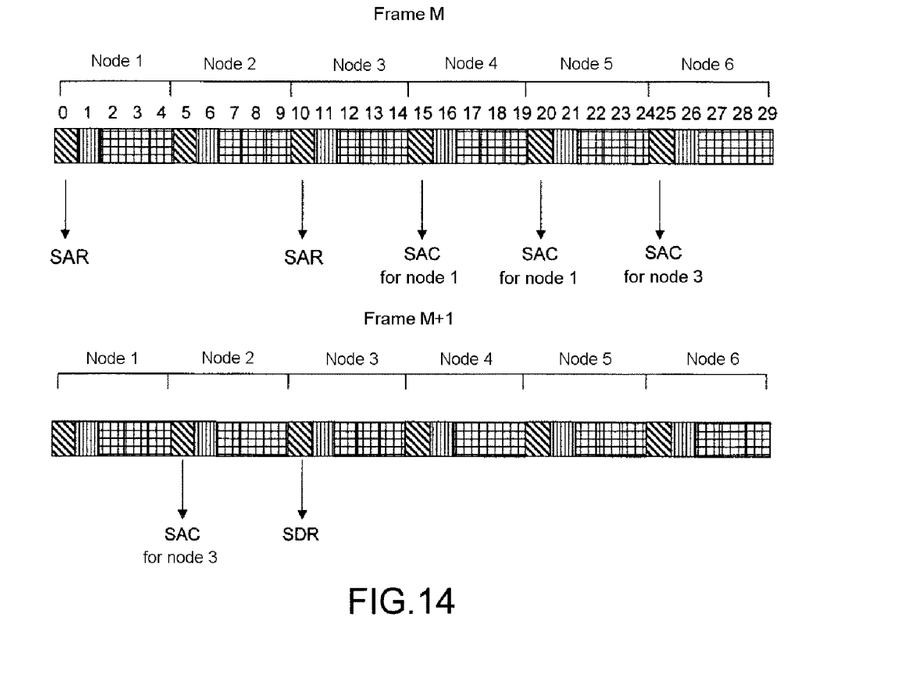

An SDR message declares the SAR message previously transmitted obsolete and invites all the nodes which have received the SAR message to deallocate all the slots contained in this message FIG. 14 shows schematically an example of exchanges of messages between node 1 which dispatches an SAR message so as to allocate slot 2.

This message is received by nodes 4 and 5 which will dispatch their SAC messages in the control slot of $C_4$ and $C_5$. Node 3 being 3 hops away from node 1, it does not receive this message and dispatches in $C_3$ its own SAR message. In $C_5$, node 5 dispatches an SAC message using node 1 as destination address and does not dispatch any SAC message to node 3 since its SAR packet arrives after that sent by node 1.

On receipt of the SAC message of node 5, node 1 sees that the destination address is node 1 instead of node 3 and that node 1 has sent a request for slot 2. Since node 1 is 2 hops away from node 3, they may not use the same slot. Thus, node 3 dispatches an SRD message. Nodes 2, 5 and 6 each update their DRAM table by canceling the previous requests and dispatch a slot deallocation confirmation message (SDC message).

| Slot ID | 2 | Slot ID | 6 |
| --- | --- | --- | --- |
| Status | 00001001001000000100 | Status | 00001001001000000000 |
| After receipt of SAR dispatched by node 3 | | After receipt of DRS dispatched by node 3 | |

Input DRAM table of nodes 2 and 6 after receipt of the SAR and SDR messages.

When a node receives an SAR message, it updates its DRAM table and dispatches an SAC message using the source address of the SAR packet received as destination address. As long as a node has not sent an SAC confirmation message, it does not take account of any new SAR messages. For each SDR message, a node should wait until all the nodes situated in proximity "next hop(s)" have responded with an SDC packet. Otherwise, the SDR message is transmitted anew.

If a slot is used by more than one session, its ID is not dispatched in the deallocation message.

The use of the slots requested by a node will be considered to be possible only when it has received the confirmation of all its direct neighbors. The acceptance of the request to reserve resources is then proclaimed and the associated slots are actually reserved.

Dissection of a Global Resource Reservation, of RSVP Type, at the MAC Layer Level In order to support the resource reservation request at the MAC level, two parameters are introduced in the MAC request:

τ (parameter MD defined at the MAC level): maximum deadline required to access the radio medium, R (parameter RB defined at the MAC level): minimum throughput required.

These two parameters are used in the allocation algorithm set out above or in any other type of allocation algorithm, so as to guarantee compliance with the reservation request with service guarantee.

In the case of a periodic TDMA, the message Resv for the RSVP resource request is expressed in the MAC layer in terms of MAC reserved packets.

The RSVP parameters are described according to the RFC specifications of the IETF known to the person skilled in the art.

For example, the parameters used to describe the envelope of the traffic according to the token seal model are (according to the "token bucket" recommendation RFC 2212):

p=peak throughput (bytes/sec)
b=capacity of the bucket ("bucket depth") (bytes)
r=throughput of the token bucket rate (bytes/sec)
m=minimum granularity ("minimum policed unit") (bytes)
M=maximum size of the data packets of the application ("maximum datagram size") (bytes)

The transmission deadlines for each node I are described by the following two parameters:

$C_I$=factor dependent on the throughput ("rate dependent factor") (bytes)
$D_I$=term independent of the throughput ("rate independent term") (sec)

Thus, the bound of the transmission deadline for a packet at a minimum throughput R for node I is:

$$\tau_I = C_I/R + D_I$$

In the case of a TDMA with slots which are completely periodic at the level of each node the RSVP calculation method can be used by establishing a rigorous correspondence between the MAC parameters and the RSVP parameters.

The mathematical relations between the parameters $C_i$ and $D_i$ of the AdSpec field (of the PATH message of the RSVP protocol) and of the parameters of the MAC level previously described are then as follows:

$C_i$: size of an MAC packet (in bytes)
$D_i$: possible additional deadline related to the processing and to the internal transit of an MAC packet For identical nodes, the parameters are independent of the node and no longer need to be indexed (in the description C and Ci are employed to designate one and the same parameter; the same holds for D and Di).

Note that the relation for the parameter C is rigorously valid only if the interleaving algorithm leads to a uniform temporal distribution of the physical slots of each node inside the global frame and if the MAC packets of one and the same session are distributed over distinct physical slots.

In the case of periodic access to a radio network by a node (this implies that all the TDMA slots used are also distributed in the frame), the maximum deadline $\tau$ to transmit a packet for a session considered is:

$$\tau = N \cdot K \cdot Ts/m + D \text{ (for } m \leq K + H)$$

and available throughput R (for the session considered) is:

$$R = m \cdot BR/(K \cdot N \cdot NPS)$$

With the following MAC parameters (in part previously defined):
BR: throughput of the TDMA channel,
N: number of nodes of the network,
K: number of physical slots for a node,
H: number of physical slots borrowed by the node considered,
Ts: duration of a physical slot,
m: number of MAC packets (logic slots) reserved ($m \leq (K+H) \cdot q$),
NPS: number of MAC packets per physical slot,
the maximum transmission deadline for the node may therefore be written:

$$D + C/R = \tau + D$$

i.e.:

$$C/R = N \cdot K \cdot Ts/m$$

therefore $C = BR \cdot Ts/NPS$ = size (number of bytes) of an MAC packet.

D is often negligible, a relay node generally having time to process the packet during the slot waiting time.

The throughput consumed at the MAC level for the encapsulation of the packets has not been taken into account for the sake of simplification. Taking this encapsulation into account amounts to considering R as the useful throughput for the application.

In the general case of a TDMA with non-periodic access of the nodes (due to a distribution of the MAC packets which is generally not periodic because of an irregular temporal spacing of the slots):
the values $\tau$ (maximum packet transmission deadline) and R (minimum throughput required) are not independent and are even strongly related:
For example, R can be deduced approximately from the maximum deadline $\tau$. Actually, by using at least one MAC packet every r seconds, the minimum value of R is:

$$Rmin = (N \cdot K \cdot Ts/\tau)(BR/(K \cdot N \cdot NPS)) = Ts \cdot BR/(\tau \cdot NPS)$$

and the more regularly the MAC packets are spaced out over time, the closer R is to Rmin.

It is therefore possible to write:

$$\tau = \alpha \cdot C/R$$

where: $C = BR \cdot Ts/NPS$ = size or capacity (number of bytes) of an MAC packet
$\alpha$ is a coefficient larger than 1, which is all the closer to 1 the more regularly the radio access slots are spaced out in the frame.

At the RSVP level, the characteristics of the envelope of the application traffic are then considered to be in agreement with the token seal model such as described previously.

Now, by considering the maximum end-to-end latency, $\delta$, and by making the assumption that the maximum transmission deadline and minimum throughput are the same for each node (identical nodes on the path), the following mathematical relation is established:

$$\delta = \frac{(b-M)(p-R)}{R(p-r)} + \frac{M}{R} + n \cdot \tau$$

where n is the number of hops of the session path this formula is rewritten in the form:

$$\delta = \frac{(b-M)(p-R)}{R(p-r)} + \frac{M}{R} + n \cdot \frac{\alpha \cdot C}{R}$$

the usual RSVP relation is:

$$\delta = \frac{(b-M)(p-R)}{R(p-r)} + \frac{M}{R} + \sum_{i=1}^{n}\left(\frac{C_i}{R} + D_i\right)$$

where the parameters $C_i$ and $D_i$ characterize node i
thus, the RSVP calculation method can still be used by defining the parameters $C_i$ and $D_i$ in the following manner:

$$C_i = C$$

$D_i$ = possible additional deadline

Actually, in this case, the Resv request based on a required minimum throughput calculation with the usual formula leading to the following MAC resource reservation request:
Required bandwidth: R'
Requested maximum latency: C/R'
and the maximum deadline T and the available minimum throughput R then satisfy the following relations:

$$\tau \leq C/R'$$

$$R \geq R'$$

hence:

$$\frac{(b-M)(p-R)}{R(p-r)} + \frac{M}{R} + n \cdot \tau \leq \frac{(b-M)(p-R')}{R'(p-r)} + \frac{M}{R'} + n \cdot \frac{C}{R'} = \delta$$

thereby guaranteeing the end-to-end latency requested.

The RSVP request can then be dissected at the MAC layer:
maximum transmission deadline required: $\tau = C/R'$,
minimum throughput required: R=r.

If the resource reservation is solely due to the end-to-end latency constraint (R'>r), the request of the MAC layer is based on the maximum transmission deadline required C/R' (the constraint on the throughput will then be satisfied automatically).

Conversely, if the resource reservation is due solely to the throughput constraint (R'=r) and if the end-to-end constraint is not meaningful, the MAC request is based solely on the throughput required r (nominal throughput of the data of the application).

Figure 15:
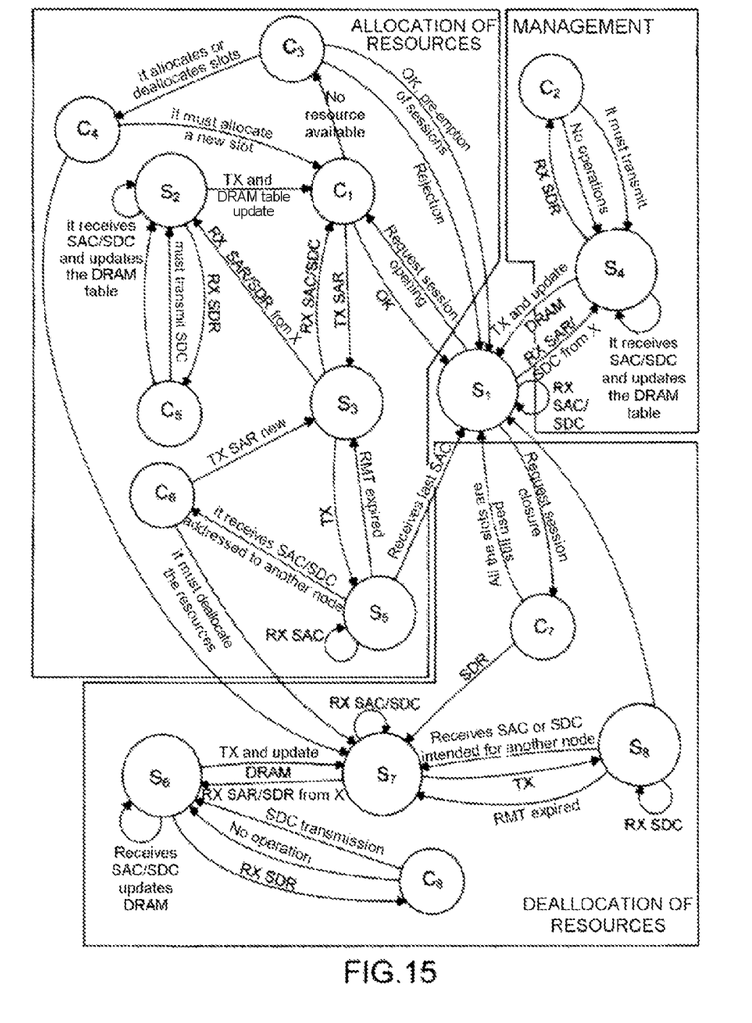
FIG. 15, a finite state automaton describing the set of states of the slot negotiation process.

FIG. 15 represents a finite state automaton for the process for negotiating the slots in the dynamic allocation method.

1—Status: Waiting

This is the standby state waiting for a new resource reservation request. possible events:
  a) opening of a session request; the MAC level should open the session with the following parameters:
    ID session;
    mean rate put of the session;
    maximum deadline;
    maximum size of the packets;
    Rule of a node (source, destination, relay, destination and relay);
    Priority.
  b) RX SAR OR SDC FROM X: the system receives a slot allocation/deallocation request from node 'X'. The system transmits respectively SAC or SDC.
  c) RX SAC or SDC: the system receives a confirmation of an allocation/deallocation of a slot one hop away. The system updates the DRAM table.
  d) Session closure request; the system closes the session.

2—Status: C1 in this state, the node analyzes the current transmission resources so as to establish whether the constraints relating to a session request are compatible with the available slots.
Events:
  a) TX SAR: the node should allocate new slots and commence the allocation mechanism;
  b) OK: no slot is allocated. The resources are already assigned for other sessions but can be reused.
  c) No resource is available; the available resources are not sufficient to satisfy the session request. The system analyzes the priority of the existing sessions so as to check whether the slots which are allocated can be reused.

3—Status S3: Waiting to Transmit SAR in its Slot the node waits to transmit its SAR packet in its control slot.
Event:
  a) RX A SAC OR SDC: if the node receives an SAC message or an SDC message, it should update its DRAM table and commence the allocation algorithm anew so as to update the algorithm for allocating slots with the new information.
  b) RX A SAR OR SDC FROM X: if the node receives an SAR or SDR message, it should transmit the SAC or SDC related messages. Thereafter it should commence the allocation procedure anew so as to update the allocation algorithm with the new information.
  c) TX: the node transmits the SAR message in its control slot.

4—Status S2: It Waits to Transmit SAC or SDC in its Control Slot the node should respond with an SAC or SDC message in its control slot.
Events:
  a) it receives SAC or SDC and updates the DRAM table: if the node receives an SAC or SDC message, it should only update the DRAM table,
  b) Tx and updating of the DRAM table: the system transmits an SAC/SDC message in its control slot,
  c) RX DRAM: if the node receives an SDR message it should analyze the source of the message so as to realize if the SDR has been dispatched by the node which has transmitted the SAR. Otherwise the SAR or SDR messages are destroyed.

5—Status C5: It Tests the Source of SDR in this state, the node should test the origin of the SDR received, named SSDR, so as to compare it with the origin of the SAR received, named SSAR. If SSDR and SSAR are equal, the system transmits an SDC packet to the origin of the SAR message. Otherwise no operation is done.
Events
  a) no operation; SSAR and SSDR are not equal;
  b) RX SDC FROM X: SSAR and SSDR are equal.

6—Status C3: It Tests the Priority

There is not a sufficient number of free slots to satisfy the resource reservation request. The node compares the priority of the new session with the priorities of the current sessions so as to close the sessions which have a lower priority level.
Events:
  a) rejection; the test gives a negative response for one of these reasons:
    there are no sessions in progress,
    the sessions in progress have a higher priority level than that of the starting session,
    the sum of the slots used and of the free slots with a low priority level is not sufficient to satisfy the request.
  b) OK with session pre-emption; the node should pre-empt sessions so as to deallocate slots which will be used for the new priority session;
  c) It allocates and/or deallocates several slots; the deallocated slots are not sufficient to execute the commencing session and the system should commence the allocation/deallocation mechanism.

7—Status C4: It Checks the DRAM Table

The node having halted the sessions, it checks the DRAM table so as to establish whether it is necessary to deallocate new slots or to deallocate nodes not used or else both.
Events:
  a) it has to allocate slots again: this condition is not satisfied if the node should deallocate unused slots. After deallocations of unused slots, the node can allocate new slots;
  b) it does not necessarily have to deallocate slots.

8—Status C5: It Tests the Source of SDR

In this state, the node should test the origin of the SDR received, named SSDR, so as to compare it with the origin of the SAR received, named SSAR. If SSDR and SSAR are equal, the node should transmit a packet of the origin of the SAR message. Otherwise no operation is done.
Events:
  a) no operation: SSAR and SSDR are not equal,
  b) RX SDC FROM X: SSAR and SSDR are equal.

9—Status S4 ditto status S2

10—Status S5: It Receives an SAC Message

The node should transmit the SAR message so as to request the necessary slots and thereafter it waits for the confirmation message (SAC) relating to the SAR message transmitted.
Events:
  a) it receives an SAC/SDC addressed to another node: if the node receives a message addressed to another node, the node commences the transmission of an SAR packet anew since several neighbors might not have received it,
  b) it receives the last SAC: the node has received the SAC messages originating from all its neighbors,
  c) RX SAC: the node has received the SAC message relating to the SAR message transmitted, but not all the neighbors have transmitted theirs,
  d) The RMT (timer) has expired; the RMT has expired and not all the neighbors have transmitted the SAC message. The SAR message should be retransmitted.

11—Status C6: It Checks SAC/SDC

The node analyzes the ID slot field of the message received so as to check whether the set of slot IDs carried in this packet complies with the set of IDs that the node has chosen.

Events:
  a) TX SAR new; the new information in the SAC/SDC message received does not satisfy the slot set requested and the node can transmit the SAR message again,
  b) It should deallocate resources: the new information in the SAC/SDC message received satisfies the set of slots requested. The node should deallocate the slots requested by the SAR previously transmitted and thereafter it should detect the slots necessary for the required session.

12—Status C7: It Tests the Request
when the node receives a session closure request, it should deallocate the related slots only if they are not used by other sessions.
Events:
  a) all the slots are still used, the deallocation algorithm is not necessary,
  b) the node generates the SDR message.

13—Status S6: It Waits to Transmit SAC or SDC in its Slot
Ditto Status S2.

14—Status C2: It Tests the Source of SDR
In this state the node should test the origin of an SDR received, named SSDR, so as to compare it with the origin of the SAR received, named SSAR. If the SSDR and SSAR are equal, the node should transmit an SDC packet to the sender of the SAR message. Otherwise no operation should be done.
Events:
  a) no operation: SSAR and SSDR are not equal,
  b) RX SDC from X: SSAR and SSDR are equal.

15—Status S7: It Waits to Transmit SDR in its Slot
The node waits to transmit an SDR message in its own control slot.
Events:
  a) RX A SAC/SDC: if the node receives an SAC or SDC message, it should update the DRAM table,
  b) RX A SAR/SDC from X: if the node receives an SAR or SDR message, it should transmit the SAC or SDC messages and thereafter it returns to its state,
  c) TX: the node transmits the SDR message in its own control slot.

16—Status S8: It Waits to Receive an SDC Message
the node should transmit the SDR message so as to deallocate unnecessary slots and thereafter it should receive the confirmation message (SDC) relating to the SDR message transmitted.
Events:
  a) it receives the SAC or SDR message addressed to another node: if the node receives an SAC/SDC message addressed to another node, the node should renew the transmission of SDR, since no neighboring node has received it,
  b) it receives the last SDCs: the node has received the SDC messages from all the neighboring nodes,
  c) RX SDC: the node has received the SDC message relating to the SDR message transmitted, but certain neighboring nodes have not transmitted their SDC message,
  d) The RMT (timer) has expired; the RMT has expired and some of the neighboring nodes have not transmitted the SDC message. It is necessary to retransmit the SDR message.

The invention claimed is:

1. A method of global resource reservation with a service guarantee of throughput, latency and jitter for nodes of a radio network, each node comprising a processor and a radio configured to transmit messages to and receive messages from other nodes in the radio network, the radio network using time slots to send and transmit data, the method comprising each node in the radio network performing the following steps:
  storing information related to neighboring nodes that are one or two hops away, the information including allocation of slots to the neighboring nodes;
  receiving a resource reservation request in a media access control (MAC) layer of the radio network, the resource reservation request indicating at least one of a maximum deadline required to access a radio medium corresponding to a maximum delay between two slots allocated to a same session to satisfy the latency and jitter guarantees, and a minimum throughput corresponding to a minimum number of slots to satisfy the throughput guarantee;
  calculating a minimum total number of slots required for a session according to a throughput constraint imposed by the resource reservation request;
  calculating a maximum delay between two consecutive slots allocated to a same session according to the latency and jitter constraints imposed by the resource reservation request;
  calculating identities of slots in a frame to satisfy the resource reservation request;
  if the identified slots include slots not allocated to the node, transmitting a slot allocation request (SAR) message to negotiate allocation of identified slots to be borrowed;
  wherein negotiating slots comprises the use of a SAR message to initiate a slot allocation request, a slot allocation confirmation (SAC) message to acknowledge a received SAR message from a neighboring node, a slot deallocation request (SDR) message to initiate a deallocation request for previously allocated slots, and a slot deallocation confirmation (SDC) message to acknowledge a SDR message received from a neighboring node, and wherein the method further comprises:
  in response to receiving a SAC message responding to the transmitted SAR message, updating the allocation of slots in the stored information in accordance with the identified slots for the resource reservation request;
  in response to receiving a SAR message that can be fulfilled by the node, transmitting a corresponding SAC message and updating the allocation of slots in the stored information in accordance with the received SAR message;
  in response to receiving a SAC message that is not responding to the transmitted SAR message, updating the allocation of slots in the stored information in accordance with slots indicated by the received SAC message;
  in response to receiving a SDR message, transmitting a corresponding SDC message and updating the allocation of slots in the stored information in accordance with the received SDR message; and
  in response to receiving a SDC message that is not responding to a transmitted SDR message, updating the allocation of slots in the stored information in accordance with slots indicated by the received SDC message.

2. The method as claimed in claim 1, further comprising:
  amalgamating K time slots from each of N frames into a pool of session slots, N being the number of nodes in the radio network, wherein the stored information relates to at least a portion of the pool of session slots.

3. The method as claimed in claim 2, wherein each node comprises:
  a dynamic resource allocation mechanism (DRAM) device containing a table configured to store:
    an identification of types of time slots that form a basic frame;

an identification number that identifies a time slot;

a status of each node of the radio network; and a visibility table configured to store:

an identification of neighboring nodes in radio visibility to said node; and an identification of nodes accessible in two hops from said node.

4. The method as claimed in claim 3, wherein unreserved session slots comprise a resource pool of free session slots from which the node can draw to satisfy the resource reservation request.

5. The method as claimed in claim 4, further comprising the steps of:

determining the session slots to commence a session to satisfy the resource reservation request, taking into account a throughput required for a service, a maximum deadline to access the radio medium and a maximum size of the packets;

consulting the DRAM status table and the visibility table in order to determine identifiers of the session slots for allocation to the session; and implementing a predetermined algorithm to select slots for the resource reservation request from the resource pool of free session slots.

6. The method as claimed in claim 5, further comprising the steps of:

choosing a set of session slots from the resource pool of free session slots;

transmitting the SAR message towards neighboring nodes;

generating a table containing neighbors within two hops, and a status field filled in as a function of a corresponding SAC message dispatched by the neighboring nodes in response to receiving the transmitted SAR message; and initializing a time counter in order to determine whether a SAC message has been lost.

7. The method as claimed in claim 6, further comprising the step of pre-empting, by a local pre-emption mechanism, as a function of a priority allocated to a session.

8. The method as claimed in any one of claims 1 to 7, further comprising a prior step of interleaving slots of each of the nodes of the radio network.

9. The method as claimed in claim 3, 5 or 6, further comprising a step of spatially reusing time slots while avoiding collisions.

10. The method as claimed in one of claims 1 to 7, wherein the resource reservation request is initiated in accordance with a Reservation Protocol (RSVP).

11. The method as claimed in claim 6, further comprising:

transmitting SDR messages and SDC messages if there is competition for session slots indicted in a previous SAR message.

\* \* \* \* \*